(12) United States Patent
Shmilovich et al.

(10) Patent No.: US 10,308,350 B2
(45) Date of Patent: Jun. 4, 2019

(54) ACTIVE FLOW CONTROL SYSTEMS AND METHODS FOR AIRCRAFT

(71) Applicant: The Boeing Company, Chicago, IL (US)

(72) Inventors: Arvin Shmilovich, Huntington Beach, CA (US); Yoram Yadlin, Irvine, CA (US); Paul Vijgen, Everett, WA (US)

(73) Assignee: The Boeing Company, Chicago, IL (US)

( * ) Notice: Subject to any disclaimer, the term of this patent is extended or adjusted under 35 U.S.C. 154(b) by 263 days.

(21) Appl. No.: 15/234,702

(22) Filed: Aug. 11, 2016

(65) Prior Publication Data
US 2018/0043995 A1    Feb. 15, 2018

(51) Int. Cl.
  *B64C 21/04*    (2006.01)
  *G05D 7/06*     (2006.01)
  *B64C 21/02*    (2006.01)
  *B64C 21/08*    (2006.01)
  *B64C 23/00*    (2006.01)

(52) U.S. Cl.
  CPC .............. *B64C 21/04* (2013.01); *B64C 21/02* (2013.01); *B64C 21/08* (2013.01); *G05D 7/0664* (2013.01); *B64C 23/00* (2013.01); *B64C 2230/04* (2013.01); *B64C 2230/06* (2013.01)

(58) Field of Classification Search
  CPC .......... B64C 21/02; B64C 21/04; B64C 21/08
  See application file for complete search history.

(56) References Cited

U.S. PATENT DOCUMENTS

| 2,868,480 A | * | 1/1959 | Attinello | B64C 23/005 244/207 |
| RE24,917 E | * | 12/1960 | Attinello | B64C 23/005 244/207 |
| 3,581,995 A | * | 6/1971 | Fischer | B64C 9/38 239/265.11 |
| 3,724,784 A | * | 4/1973 | Von Ohain | B64C 23/005 244/207 |
| 3,841,588 A | * | 10/1974 | Arnold | B64C 23/005 244/207 |
| 3,887,146 A | * | 6/1975 | Bright | B64C 29/00 244/12.1 |

(Continued)

FOREIGN PATENT DOCUMENTS

WO    2011076427    6/2011

OTHER PUBLICATIONS

European Patent Office, "Extended European Search Report," issued in connection with European Patent Application No. 17185632.1, dated Oct. 6, 2017, 11 pages.

(Continued)

*Primary Examiner* — Justin M Benedik
(74) *Attorney, Agent, or Firm* — Hanley, Flight & Zimmerman, LLC

(57) ABSTRACT

Example active flow control systems and methods for aircraft are described herein. An example method includes supplying pressurized air to a plurality of nozzles. The nozzles arranged in an array across a control surface of an aircraft, and the nozzles are oriented to eject the pressurized air in a substantially streamwise direction. The method further includes activating the nozzles to eject the pressurized air in sequence to create a wave of air moving in a spanwise direction across the control surface.

19 Claims, 10 Drawing Sheets

(56) References Cited

U.S. PATENT DOCUMENTS

| | | | | |
|---|---|---|---|---|
| 3,893,638 | A * | 7/1975 | Kelley | B64C 15/00 244/12.5 |
| 3,920,203 | A * | 11/1975 | Moorehead | B64C 21/04 244/110 B |
| 4,019,696 | A * | 4/1977 | Hirt | B64C 21/00 244/200.1 |
| 4,391,424 | A * | 7/1983 | Bartoe, Jr. | B64C 9/32 244/110 B |
| 4,392,621 | A * | 7/1983 | Viets | B64C 9/38 137/829 |
| 4,447,028 | A * | 5/1984 | Wang | B64C 9/00 244/207 |
| 4,600,172 | A * | 7/1986 | Loth | B64C 21/04 244/207 |
| 4,645,140 | A * | 2/1987 | Bevilaqua | B64C 21/04 239/265.11 |
| 4,674,717 | A * | 6/1987 | Loebert | B64C 21/04 244/207 |
| 5,062,588 | A * | 11/1991 | Garland | B64C 29/0066 244/12.4 |
| 5,806,808 | A * | 9/1998 | O'Neil | B64C 9/22 244/201 |
| 6,109,565 | A * | 8/2000 | King, Sr. | B64C 3/141 244/12.1 |
| 6,682,021 | B1 * | 1/2004 | Truax | B64C 23/06 138/38 |
| 6,926,229 | B2 * | 8/2005 | Cummings | B64C 15/02 244/12.5 |
| 7,635,107 | B2 | 12/2009 | Shmilovich et al. | |
| 8,087,618 | B1 * | 1/2012 | Shmilovich | B64C 9/38 244/198 |
| 8,336,828 | B2 | 12/2012 | Shmilovich et al. | |
| 8,632,031 | B2 | 1/2014 | Shmilovich et al. | |
| 9,108,725 | B1 * | 8/2015 | Shmilovich | B64C 21/04 |
| 9,371,132 | B2 | 6/2016 | Shmilovich et al. | |
| 2006/0102801 | A1 * | 5/2006 | Manley | B64C 21/04 244/208 |
| 2007/0034746 | A1 * | 2/2007 | Shmilovich | B64C 9/16 244/207 |
| 2011/0108672 | A1 * | 5/2011 | Shmilovich | B64C 9/18 244/207 |
| 2012/0001028 | A1 * | 1/2012 | Frey | B64C 9/16 244/208 |
| 2012/0256049 | A1 * | 10/2012 | Shmilovich | B64C 9/38 244/1 N |
| 2014/0091180 | A1 | 4/2014 | Shmilovich et al. | |
| 2014/0119878 | A1 * | 5/2014 | Shmilovich | B64C 21/04 415/1 |

OTHER PUBLICATIONS

European Patent Office, "Communication Pursuant to Article 94(3) EPC", issued in connection with European Application No. 17185632.1 dated Mar. 20, 2019, 6 pages.

* cited by examiner

ACTIVE FLOW CONTROL SYSTEMS AND METHODS FOR AIRCRAFT

FIELD OF THE DISCLOSURE

This disclosure relates generally to aircraft and, more particularly, to active flow control systems and methods for aircraft.

BACKGROUND

Aircraft employ movable control surfaces to affect the aerodynamic lift of the aircraft. Control surfaces may include, for example, flaps, slats, ailerons, etc. When a control surface such as a flap is deployed, the airflow over the top of the wing separates from the airflow along the bottom of the wing and reattaches downstream of the wing. However, the airflow over the top of the wing does not follow the entire upper surface of the wing and control surface. Instead, the airflow detaches or separates from the upper surface of the wing and control surface and a separation pocket or deadzone is created behind the control surface. This separation pocket produces drag and decreases the lift generated by the wing.

SUMMARY

An example method disclosed herein includes supplying pressurized air to a plurality of nozzles. The nozzles are arranged in an array across a control surface of an aircraft, and the nozzles are oriented to eject the pressurized air in a substantially streamwise direction. The example method also includes activating the nozzles to eject the pressurized air in sequence to create a wave of air moving in a spanwise direction across the control surface.

An example apparatus disclosed herein includes a plurality of nozzles arranged in an array across a control surface of an aircraft. The nozzles are oriented to eject air in a substantially streamwise direction. The example apparatus also includes an air supply coupled to the nozzles and a controller to activate the nozzles to eject air in sequence to create a wave of air moving in a spanwise direction across the control surface.

Figure 1:
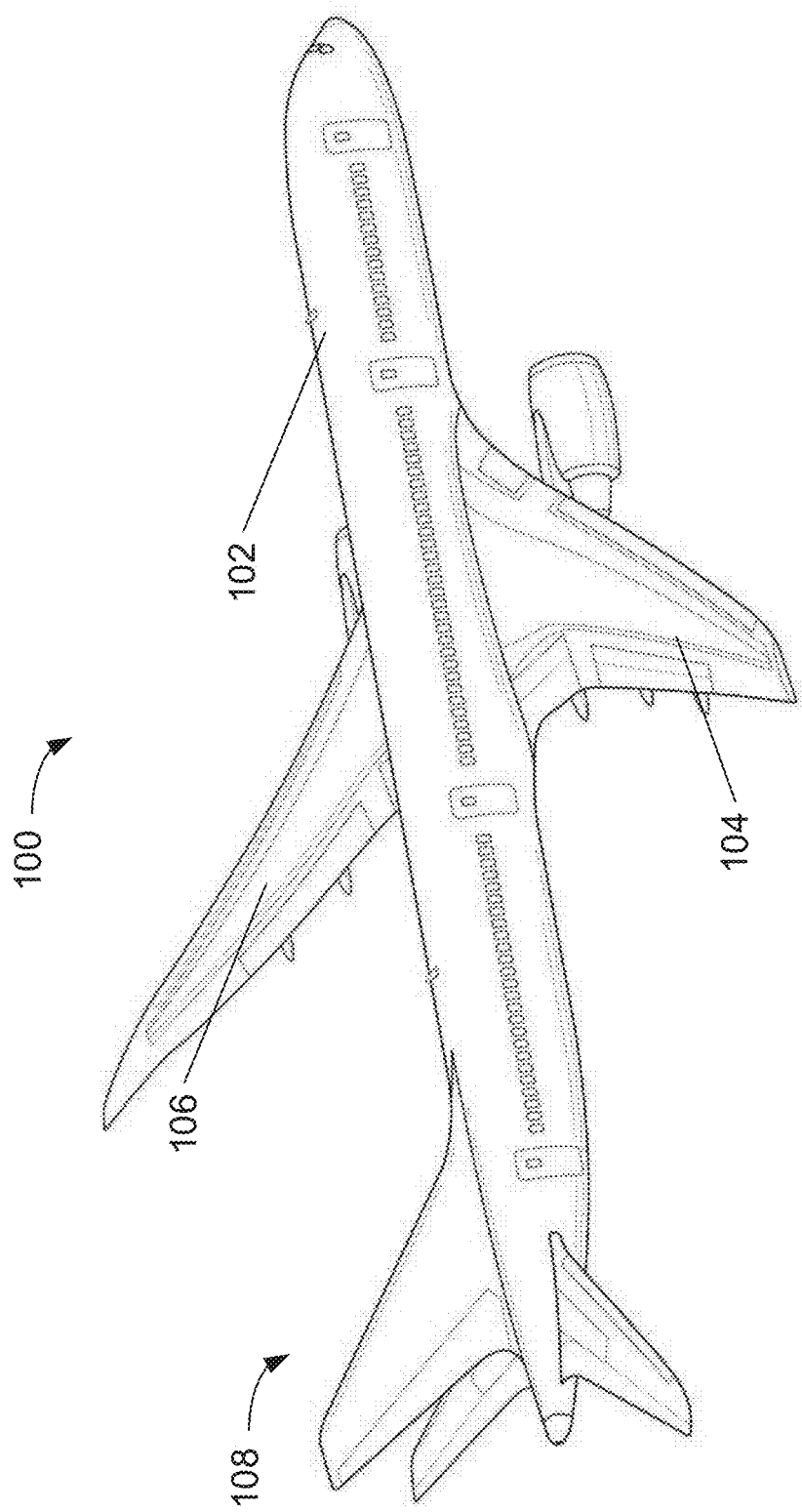
FIG. 1 illustrates an example aircraft in which the example active flow control systems and methods disclosed herein may be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Aircraft employ movable control surfaces to affect the aerodynamic lift of the aircraft. Control surfaces may include, for example, flaps, slats, ailerons, etc. In some situations, when a control surface is deployed, the airflow over the wing does not follow the entire upper surface of the wing and control surface. Specifically, the airflow may separate from the surfaces of the wing and the control surface. As a result, a separation pocket or deadzone is created around the upper surface of the wing or the control surface, which causes flow reversal and/or turbulence in the area behind the wing. Such turbulence and flow reversal increases drag and reduces the amount of lift generated by the wing.

To address the above drawbacks, some known aircraft employ an active flow control system to reduce the airflow separation and turbulence in the wake of the control surface. Known active flow control systems eject high pressure air in a streamwise direction from across the control surface. As used herein, the streamwise direction generally refers to the direction the external air flows across the surfaces of the aircraft while moving (e.g., during flight, take-off, landing, etc). The high pressure air imparts momentum into the wake or area along the upper surface the control surface, which typically has relatively low velocity. By energizing this area, the airflow over the wing remains closer to the skin of the wing and control surface (i.e., reduces the size of the boundary layer) and, thus, decreases the separation or detachment of the airflow from the wing and control surface.

Known active flow control systems provide a continuous flow of air through a slot formed in the control surface and aimed in the streamwise direction (e.g., rearward relative to the aircraft). However, supplying continuous airflow across the control surface requires a significant amount of supply air. In some instances, the supply air is bleed air that is extracted from the engine and, thus, decreases the efficiency of the engine. The larger the amount of bleed air needed, the larger the engine is needed, which increases weight and leads to an increase in gross weight and a decrease in flight efficiency. In other instances, a compressor or Auxiliary Power Unit (APU) is used. However, similar to engine bleed air, relatively large compressors or APUs are needed to produce enough supply air. These large compressors and APUs similarly add weight to the aircraft and decrease the overall flight efficiency. In some instances, the amount of air supply needed renders the system impractical for the aircraft design.

Example methods, apparatus/systems and articles of manufacture are disclosed herein to reduce flow separation around a control surface while using significantly less supply air than known systems. Example active flow control systems disclosed herein include an array of adjacent nozzles disposed in or near a control surface. In some examples, the nozzles are located in the control surface and are exposed via a slot in the control surface. The nozzles are oriented or pointed to eject pressurized air in a substantially streamwise direction to cause airflow reattachment around the corresponding section of the control surface. A valve is coupled to each of the nozzles, and pressurized air is provided to the valves via a high pressure air source. In some examples, the nozzles are converging-diverging nozzles, which accelerate the pressurized air to a relatively high velocity (e.g., supersonic speed). A controller activates the nozzles (by opening the respective valves) sequentially (e.g., in series or order) to create a streamwise ejecting jet that travels in the spanwise direction. In other words, the nozzles are activated to eject the pressurized air in sequence to create a wave of air moving in the spanwise direction across the control surface. As used herein, the term spanwise direction is associated with a span of a control surface, which is the direction that the control surface (or the wing) extends from the fuselage of an aircraft. This cross-flow motion produces momentary and instantaneous flow attachment in the region around the respective wing section and, thus, increases the effectiveness of the control surface.

As the air jet traverses along the control surface, the created effect lingers. In other words, the airflow remains attached over the respective wing segment for a period of time beyond the cessation of the air jet. Further, the wing segment affected is larger than the width of an active nozzle and extends to the trailing edge. However, the airflow eventually begins to separate again. In some examples, the sequence is activated at a frequency or rate based on the characteristic time scale of the airflow. For example, after a nozzle is deactivated, and before full separation occurs, the nozzle is activated again in the next repeating sequence. This continuous actuation results in improved streamlining of the airflow at the control surface. Additionally, it creates an induced ripple effect that helps attach the flow over the outboard wing segment. These effects increase global circulation, which results in greater lift production.

In some examples, the nozzles are activated according to a wave pattern. As used herein, the terms "wave pattern," "nozzle activation sequence" or "actuation mode" may be used interchangeably and mean the schedule or sequence for activating and/or deactivating the nozzles of the example active flow control systems. Various example wave patterns disclosed herein may be implemented by the example active flow control systems. One example wave pattern includes activating and deactivating the nozzles one at a time, in order, such that only one of the nozzles is activated at a time. For instance, each nozzle may be activated for a period of time. When one nozzle is deactivated, the next nozzle is activated. The wave pattern may travel from outboard to inboard or from inboard to outboard. In some examples, when the last nozzle is deactivated, the wave pattern repeats starting with the first nozzle. In another example wave pattern, multiple nozzles may be activated and deactivated at a time. For example, a relatively wide wave pattern may be implemented where a set (e.g., two or more) of adjacent nozzles are activated at a time. In some examples, multiple waves or groups may be activated simultaneously and separated by an interval. For example, a first wave may be started at the first nozzle and a second wave may be started at the third nozzle, where the waves occurs substantially simultaneously. The first and second waves may be separated by at least one nozzle, for example. The first and second waves may propagate, for example, outboard to inboard.

By selectively activating only certain nozzles at particular times, the example systems and methods use significantly less supply air than known systems that require a constant stream of supply air across the entire length of the control surface. For example, the amount of airflow needed to produce the same amount of lift is approximately one-eighth the amount of airflow needed for known systems that require a constant stream of air. Thus, smaller compressors/APUs and/or less bleed air is needed to support the example systems disclosed herein. As a result, the example active flow control systems require significantly less resources and can be implemented in more aircraft. Additionally, because relatively smaller aircraft engines and/or compressors/APUs are required, the gross weight of the aircraft is decreased, thereby increasing the aerodynamic efficiency and fuel costs of the aircraft.

Turning now to the figures, FIG. 1 illustrates an example aircraft 100 in which the example methods, systems/apparatus and articles of manufacture disclosed herein may be implemented. In the illustrated example, the aircraft 100 includes a fuselage 102 and a first wing 104 and a second wing 106 that are coupled to the fuselage 102. The first and second wings 104, 106 include movable control surfaces such flaps, slats, ailerons and/or other high lift devices that are located along the leading and trailing edges of the first and second wings 104, 106. Further, control surfaces are also employed on a tail section 108 of the aircraft 100. The control surfaces may be displaced or extended to change the aerodynamic lift of the aircraft 100 (e.g., during take-off or landing). When extended from the first wing 104, for example, a control surface may increase the effective size, camber and/or area of the first wing 104, thereby increasing the lift of the first wing 104. Control surfaces are often used during take-off and landing where relatively large lift forces are needed.

Figure 2:
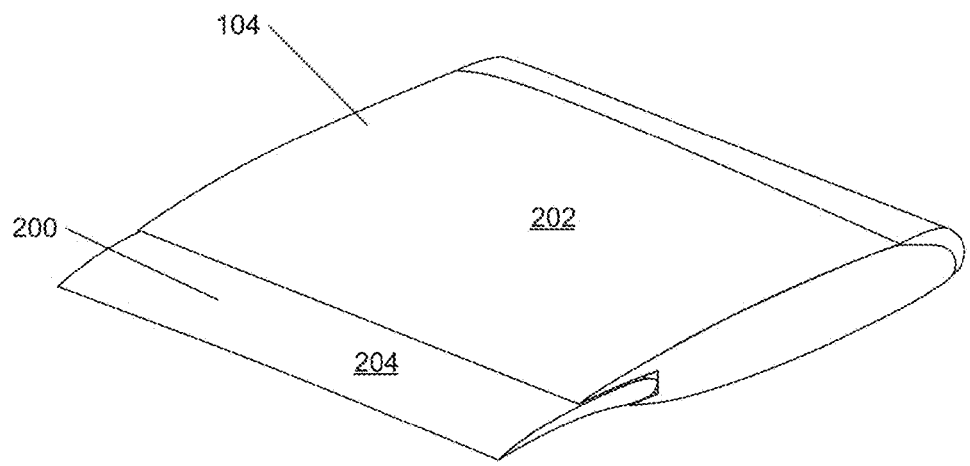
FIG. 2 illustrates an example wing section having an example control surface of the example aircraft of FIG. 1 in a stored position.
Figure 3:
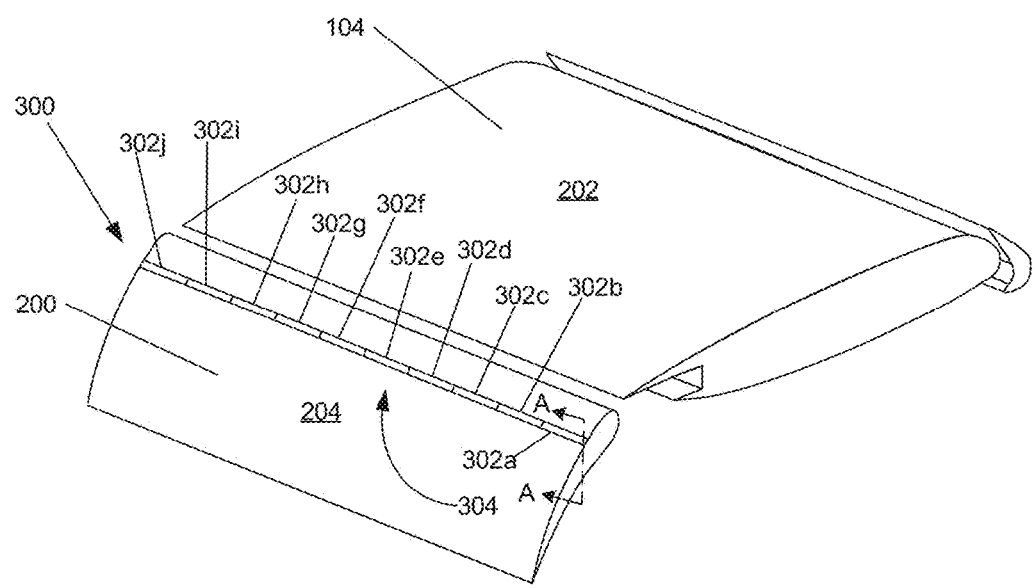
FIG. 3 illustrates the example control surface of FIG. 2 in a deployed position and having an example active flow control system constructed in accordance with the teachings of this disclosure.

FIG. 2 illustrates an example control surface, namely, a flap 200 coupled to the first wing 104 of the aircraft 100 (FIG. 1). The flap 200 is movable between a stowed or stored position, as illustrated in FIG. 2, and a deployed or extended position as illustrated in FIG. 3. The flap 200 is often deployed during take-off and landing to change the camber of the first wing 104 and to affect the lift of the aircraft 100. The airflow over an upper surface 202 of the first wing 104 separates from the airflow beneath the first wing 104 and reattaches downstream of the flap 200. When the flap 200 is deployed, the pressure gradient at the flap hinge line triggers flow separation. The decambering of the streamlines reduces global circulation, which limits the lift generated by the first wing 104. As discussed above, this flow separation results in deadzone adjacent an upper surface 204 of the flap 200.

To decrease the separation occurring along the upper surface 204 of the flap 200, an example active flow control system 300 is employed. The active flow control system 300 includes a plurality of nozzles that eject (e.g., dispense) pressurized air in the streamwise direction. In the illustrated example, ten nozzles are employed: a first nozzle 302a, a second nozzle 302b, a third nozzle 302c, a fourth nozzle 302d, a fifth nozzle 302e, a sixth nozzle 302f, a seventh nozzle 302g, an eighth nozzle 302h, a ninth nozzle 302i, and a tenth nozzle 302j. However, in other examples, the active flow control system 300 may employ more or fewer nozzles. In the illustrated example, the nozzles 302a-302j are arranged adjacent to one another in a row or array extending substantially across the length of the flap 200. In other examples, the nozzles 302a-302j may extend across a smaller portion or section of the flap 200.

In the illustrated example of FIG. 3, the nozzles 302a-302j are disposed within the flap 200 (e.g., within a front part of the flap) and are exposed via a slot 304 (e.g., an ejection slot, an opening, a slit, etc.) in the upper surface 204 of the flap 200. The slot 304 extends along the flap 200 in the spanwise direction. In the stowed position, as illustrated in FIG. 2, the slot 304 is concealed beneath the upper surface 202 of the first wing 104. However, in the deployed position, as illustrated in FIG. 3, the slot 304 and the nozzles 302a-302j are exposed.

In the illustrated example, the nozzles 302a-302j are oriented or pointed to eject air in a streamwise direction or a substantially streamwise direction when the flap 200 is deployed. By ejecting air in the streamwise direction, momentum is imparted in the wake behind the flap 200, which causes the airflow over the upper surface 202 of the first wing 104 to remain closer to the upper surface 202 of the first wing 104 and the upper surface 204 of the flap 200 and, thus, reduces separation.

Figure 4:
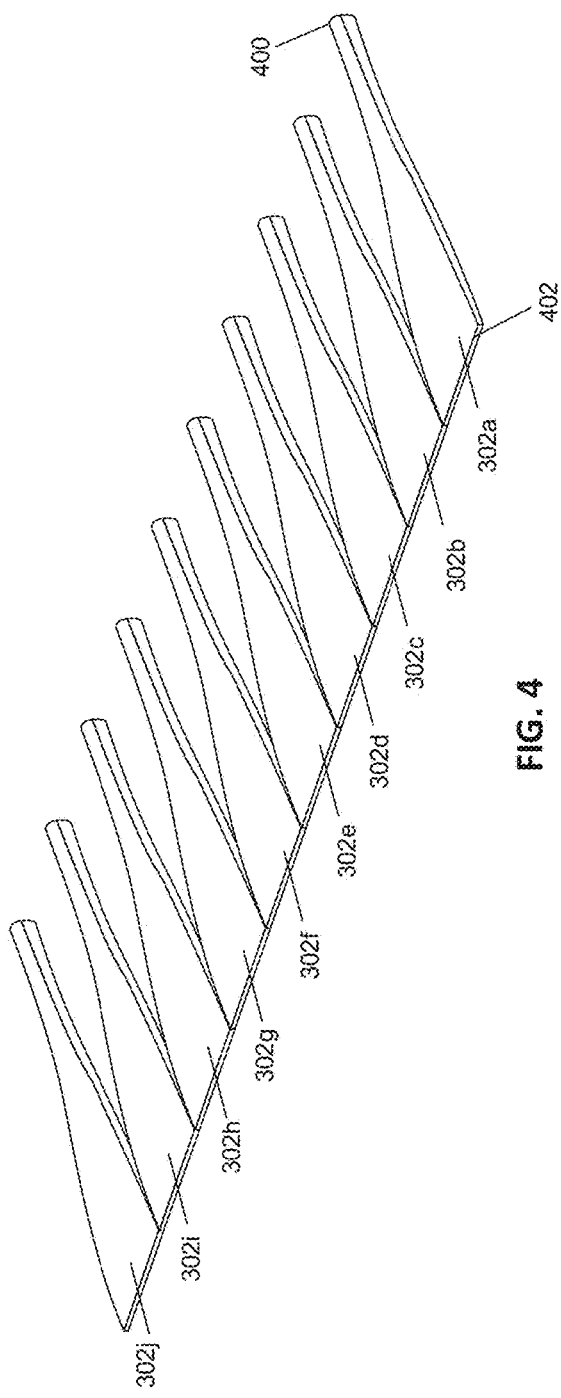
FIG. 4 illustrates an example array of nozzles of the example active flow control system of FIG. 3.

FIG. 4 illustrates the example nozzles 302a-302j in isolation (without the flap 200). In the illustrated example, each of the nozzles 302a-302j includes an inlet and an outlet (e.g., an ejector). The outlets of the nozzles 302a-302j are aligned with the slot 304 (FIG. 3) in the flap 200. For example, the first nozzle 302a includes an inlet 400 and an outlet 402. Pressurized air is supplied to the inlet 400 (described in further detail herein) and ejected from the outlet 402. In the illustrated example, the outlet 402 has a flattened elongated shape (e.g., a rectangular shape).

Figure 5:
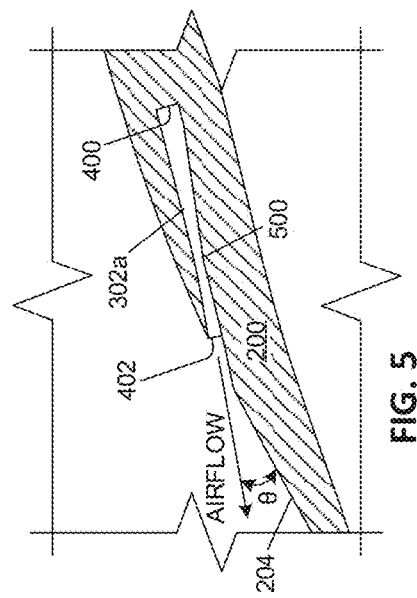
FIG. 5 is a cross-section of one of the example nozzles of FIG. 4 taken along line A-A of FIG. 3.

FIG. 5 is a cross-section of the first nozzle 302a taken along line A-A in FIG. 3. In the illustrated example, the first nozzle 302a is a converging-diverging nozzle (or "CD" nozzle), which provides a high momentum ejection jet. As used herein, a converging-diverging nozzle is a nozzle having a converging section (e.g., a section of converging or decreasing cross-sectional area or width) followed by a diverging section (e.g., a section of diverging or increasing cross-sectional area or width). For example, as illustrated in FIG. 5, the cross-sectional area of the first nozzle 302a decreases or converges from the inlet 400 to a point 500 (e.g., a throat or minimum area), and then the cross-sectional area increases or diverges from the point 500 to the outlet 402. The converging-diverging nozzle shape produces relatively fast airflow, similar to a ramjet or rocket. In some examples, the shape ejects the air at supersonic speeds. In the illustrated example of FIG. 4, the other nozzles 302b-302j have substantially the same shape as the first nozzle 302a. In other examples, one or more of the nozzles 302a-302j may have a different shape and/or may be sized differently.

In some examples, the nozzles 302a-302j are oriented at a relatively shallow angle relative to the upper surface 204 of the flap 200 flap, which enhances Coanda effect. For example, as illustrated in FIG. 5, the first nozzle 302a is oriented to eject airflow at an angle θ relative to the upper surface 204 of the flap 200. In the illustrated example, the angle θ is about 20°. In other examples, the angle may be more or less than 20°.

Figure 6:
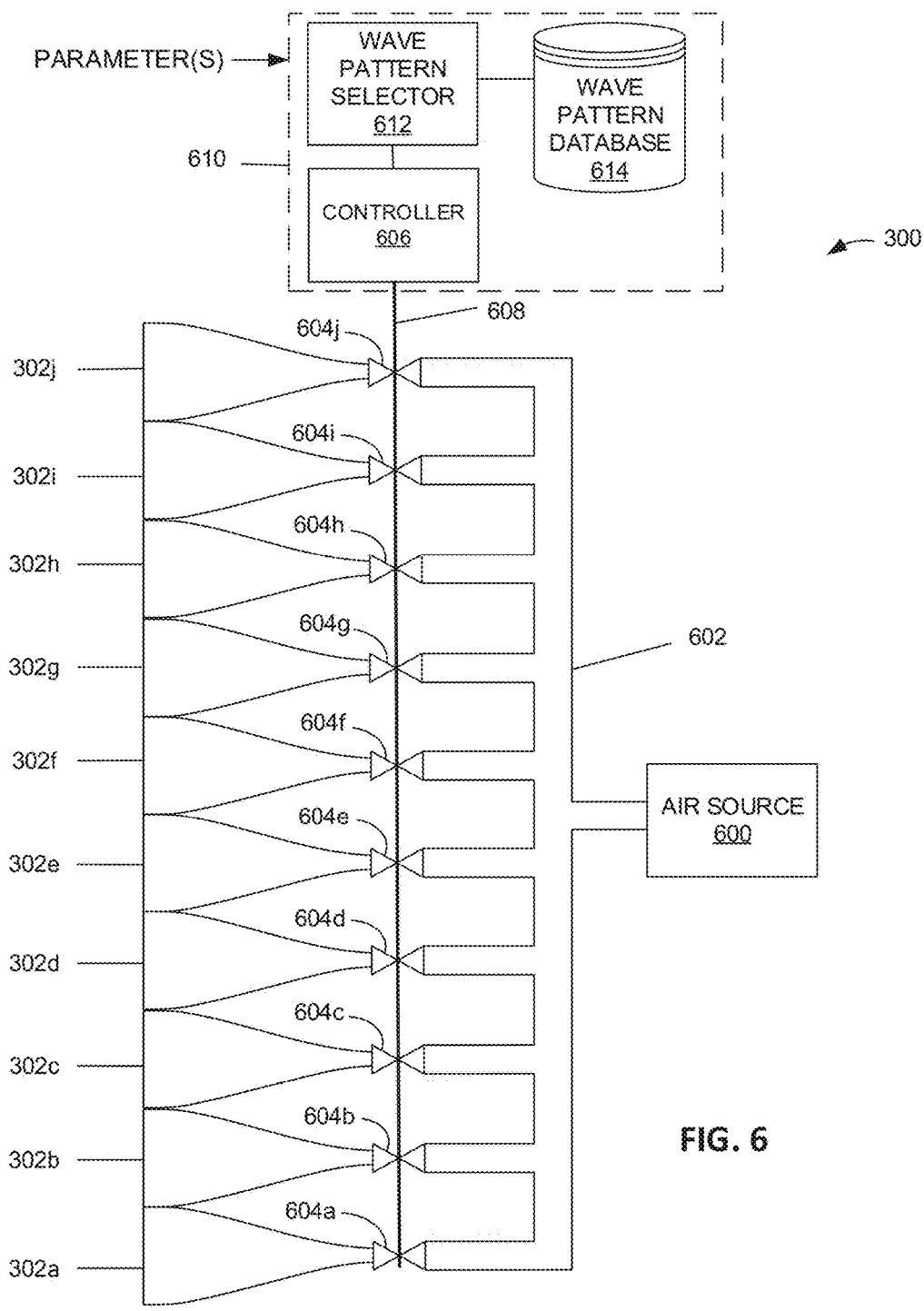
FIG. 6 is a schematic of the example active flow control system of FIG. 3.

FIG. 6 is a schematic of the example active flow control system 300. In the illustrated example, an air source 600 (e.g., an air supply) provides pressurized air to the nozzles 302a-302j via a manifold or piping system 602. In some examples, the air source 600 is bleed air extracted from one or more of the engines of the aircraft 100 (FIG. 1). Additionally or alternatively, in some examples, the air source 600 includes one or more compressors or APUs. To activate the nozzles 302a-302j, valves 604a-604j are coupled between the piping system 602 and the corresponding nozzle 302a-302j. The valves 604a-604j can be opened or closed to regulate the pressurized air supplied to the respective nozzles 302a-302j. In the illustrated example, the active flow control system 300 includes a controller 606 to control (e.g., operate) the valves 604a-604j. The controller 606 is coupled to the valves 604a-604j via a communication line 608, which may include any wired or wireless network. In some examples, multiple air sources are implemented. For example, a plurality of compressors may be implemented, where a compressor may be designated for each of the nozzles 302a-302j. In such an example, activating the nozzles 302a-302j may include activating the compressors for the respective nozzles 302a-302j (in addition to or as an alternative to operating the respective valves 604a-604j).

In some examples, the controller 606 activates the nozzles 302a-302j (via the respective valves 604a-604j), simultaneously or individually, according to a wave pattern. In the illustrated example, a control system 610 includes the controller 606, a wave pattern selector 612 and a wave pattern database 614. In some examples, the wave pattern selector 612 analyzes one or more parameters of flight and selects a wave pattern from the wave pattern database 614 based on the one or more parameters. The parameter(s) may include, for example, an ambient air temperature, an altitude of the aircraft 100, a ground speed of the aircraft 100, a relative airspeed of the aircraft 100, an angle or position of the associated control surface (e.g., the flap 200), a weather condition and/or any other flight setting or control surface setting. In other examples, the wave pattern selector 612 generates a wave pattern based on the parameter(s).

Figure 7:
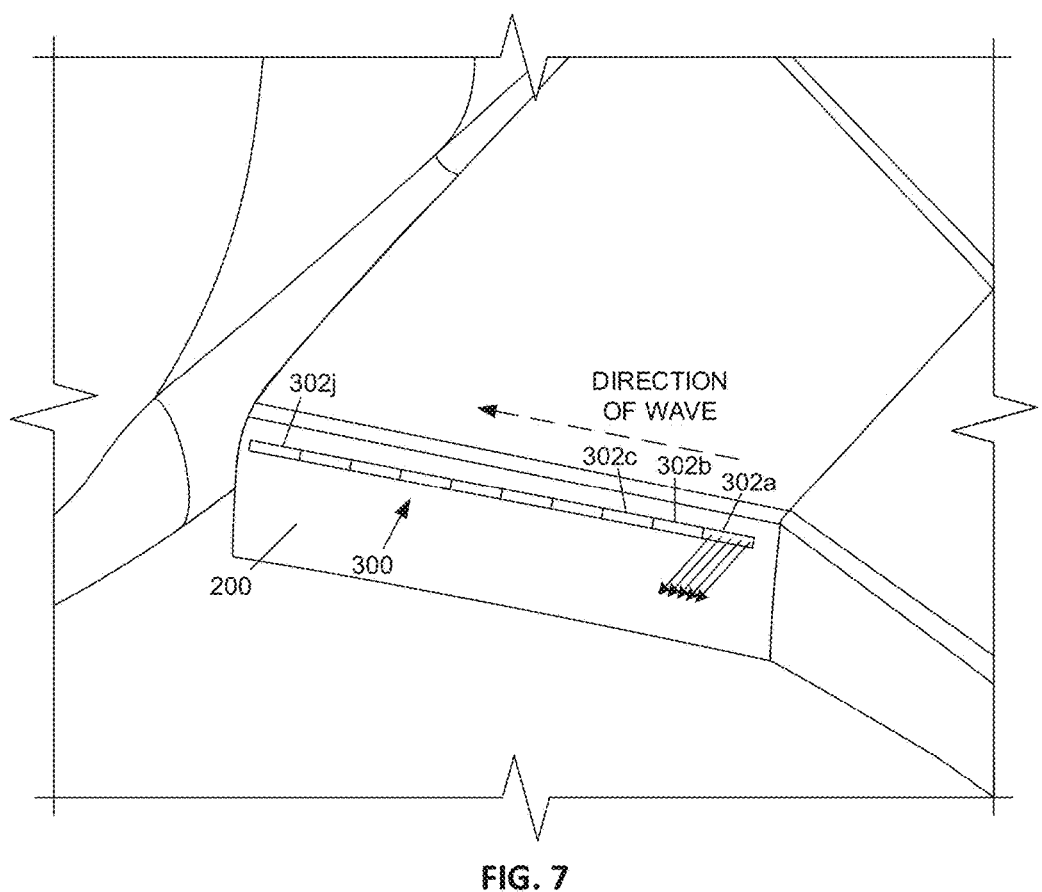
FIG. 7 illustrates an example narrow wave pattern implemented by the example active flow control system of FIG. 3.

FIG. 7 illustrates an example wave pattern, referred to as a narrow wave pattern, that may be implemented by the example active flow control system 300. In the example narrow wave pattern, the nozzles 302a-302j are activated in sequence (e.g., in series or order) to eject pressurized air in the streamwise direction such that a wave of air is created that moves in a spanwise direction (as indicated by the arrow) across the flap 200. In the illustrated example, the wave pattern moves from outboard to inboard. For example, the first nozzle 302a is activated (e.g., by opening the first valve 604a (FIG. 6)), as illustrated by the airflow arrows in FIG. 7. After a period of time, the first nozzle 302a is deactivated and the second nozzle 302b is activated (e.g., by opening the second valve 604b (FIG. 6)). After another period of time, the second nozzle 302b is deactivated and the third nozzle 302c is activated (e.g., by opening the third valve 604c), and so forth. This activation/deactivation process continues across all of the nozzles 302a-302j. In some examples, when the wave pattern reaches the tenth nozzle 302*j* (e.g., the inner most nozzle), the wave pattern is started again with the first nozzle 302*a*. The wave pattern may repeat numerous times, as desired. In other examples, the wave pattern may return in the reverse direction, back towards the first nozzle 302*a* (from inboard to outboard).

In some examples, the rate or frequency at which the wave moves is such that full separation of the airflow from the surface of the flap 200 (e.g., the separation that would otherwise occur without the active flow control system 300) is impeded. For instance, when the first nozzle 302*a* is activated, the airflow separation is decreased and the airflow over the first wing 104 along the chord of the first nozzle 302*a* is relatively streamlined. When the first nozzle 302*a* is deactivated, the streamline effect lingers, but the airflow eventually begins to separate. This transition is not instantaneous, but may occur over a relatively short period of time (e.g., 1 second). Before the flow can fully separate again, the start of the next wave (e.g., a second wave) begins by activating the first nozzle 302*a* again and, thus, momentum is again imparted into the area behind the flap 200 by the first nozzle 302*a*. Therefore, the frequency of or rate at which of the wave pattern repeats may be such that it impedes or prevents the airflow from completely separating, which may be referred to as the characteristic time scale of the flow. In some examples, the frequency or rate is determined based on the one or more parameters (FIG. 6). When the airflow over the first wing 104 is relatively fast, for example, the airflow may separate relatively quickly. Thus, a wave pattern with a higher frequency or rate may be implemented to impede full separation.

In some examples, each of the nozzles 302*a*-302*j* is activated for a same period of time. For example, each of the nozzles 302*a*-302*j* may be activated for 0.1 s. In other examples, the periods of time may be different than one another. In some examples, one nozzle is deactivated at the same moment the next nozzle is activated. In other examples, there may be an overlap during which both nozzles are active or there may be a gap in time in which no nozzles are active. By only activating one of the nozzles 302*a*-302*j* at a time, the amount of pressurized air needed is significantly less than the amount of air need when using a constant flow of air as is the case in known systems. Additionally, by using a wave pattern having a frequency or rate that prevents full separation of airflow, the example active flow control system 300 produces substantially the same effect as known systems that employ a constant stream of air. Thus, the example active flow control system 300 achieves substantially the same result while using significantly less pressurized air.

Figure 8:
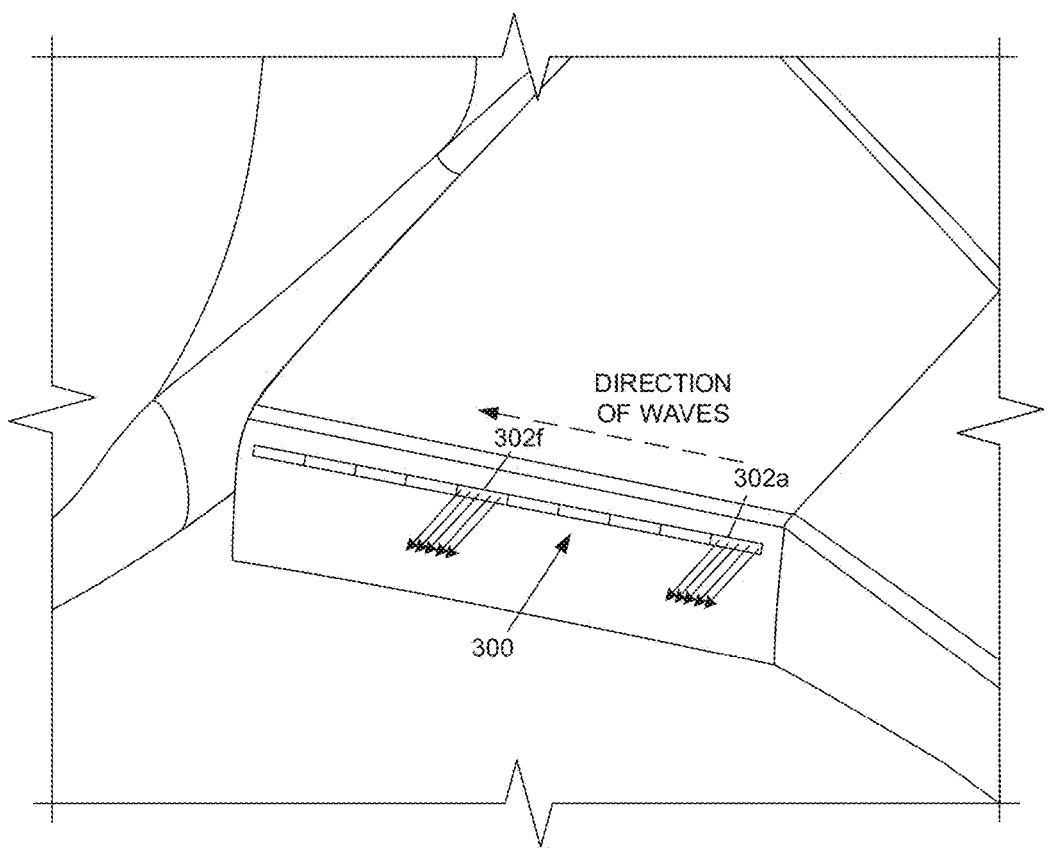
FIG. 8 illustrates an example multi-wave pattern implemented by the example active flow control system of FIG. 3.

Another example wave pattern that may be implemented by the example active flow control system 300, referred to as a multi-wave pattern, is illustrated in FIG. 8. In the illustrated example of FIG. 8, a first wave begins with the activation of the first nozzle 302*a*. Additionally, a second wave begins simultaneously with the activation of the sixth nozzle 302*f*. The two waves move in sequence from outboard to inboard, similar to the single narrow wave pattern disclosed in connection with FIG. 7. In other examples, the waves may be offset from each other by more or fewer ones of the nozzles 302*a*-30*j*. In some examples, more than two waves may be implemented. For example, four waves may be implemented, and each wave may be offset from the next wave by one or more of the nozzles.

Figure 9:
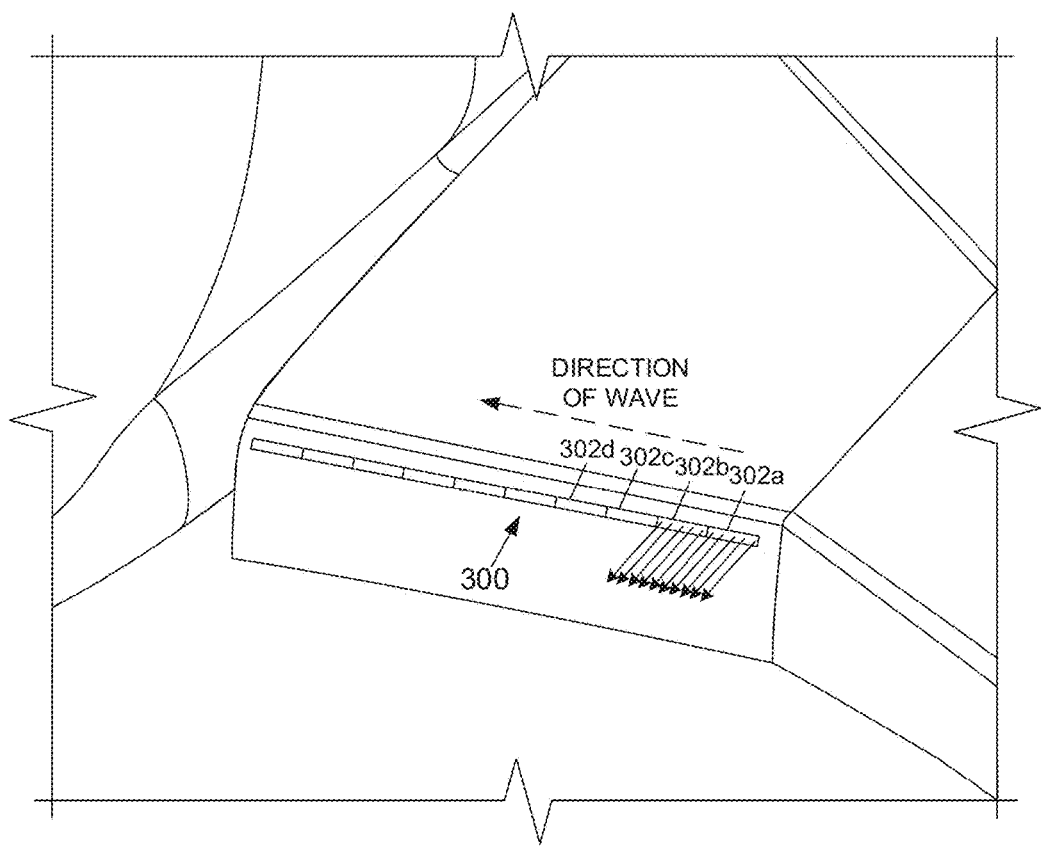
FIG. 9 illustrates an example wide wave pattern implemented by the example active flow control system of FIG. 3.

Another example wave pattern that may be implemented by the example active flow control system 300, referred to as a wide wave pattern, is illustrated in FIG. 9. In a wide wave pattern, two or more adjacent ones of the nozzles 302*a*-302*j* are activated at the same time to produce a relatively wide wave (e.g., a wave that is wider than the narrow wave pattern of FIG. 7). For example, the first nozzle 302*a* and the second nozzle 302*b* may be activated at the same time. After a period of time, the first nozzle 302*a* and the second nozzle 302*b* are deactivated and the third nozzle 302*c* and the fourth nozzle 302*d* are activated, and so forth. As such, a relatively wide wave of mass flow propagates from outboard to inboard. In other examples a more continuous actuation pattern may be obtained, for example, where the first nozzle 302*a* is deactivated and the third nozzle 302*c* is activated while the second nozzle 302*b* remains active. Then, after a period of time, the second nozzle 302*b* is deactivated and the fourth nozzle 302*d* is activated while the third nozzle 302*c* remains activate, and so forth.

Thus, many different wave patterns may be implemented by the example active flow control system 300. As discussed above, the selection of a wave pattern may be based on one or more parameters of flight. In all of the example wave patterns, significantly less air is required than is required with known systems that use a constant airflow. Thus, the engine(s) of the aircraft 100 can be significantly smaller (because less bleed air is required) and/or the size and weight of the compressor(s) and/or APU(s) can be reduced, thereby increasing the overall efficiency of the aircraft. In other words, relatively smaller compressors(s) and/or APU(s) can be employed because significantly less air is required.

Figure 10:
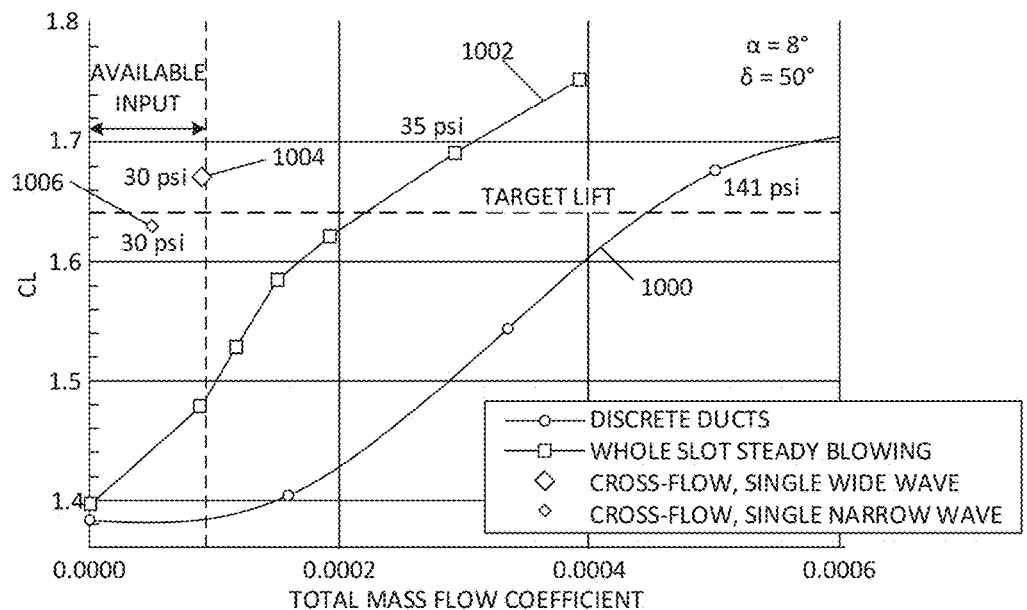
FIG. 10 illustrates a graph showing example simulation results of lift increments obtained with various actuation modes.

FIG. 10 is graph showing example simulation results of various actuation modes. The X-axis represents the total mass flow coefficient and the Y-axis represents the lift coefficient achieved. The simulation was performed for a wing at a representative landing condition with a flap deflected at 50° ($\delta$) at Mach number 0.2 and an angle-of-attack ($\alpha$) of 8°. Without any flow control, the lift coefficient for the example aircraft configuration is about 1.4. The required lift coefficient (target lift) for the example configuration is about 1.64, which is indicated by the horizontal dashed line. The amount of pressured air supply available onboard the aircraft is denoted by the vertical dash line. A first actuation mode, represented by line 1000, was simulated using a set of discrete fluidic devices placed at equal distances and blowing a constant stream of pressurized air. As illustrated, this first actuation mode results in relatively low performance and the need for relatively high pressurized air supply, which renders the actuation mode impractical for the aircraft. A second actuation mode, represented by line 1002, was simulated using a single elongated slot and a constant stream of air. This second actuation mode also produced relatively poor results and requires a relatively high pressurized air supply. A third actuation mode, represented by point 1004, was simulated using an example wide wave pattern, such as disclosed in connection with FIG. 9. As illustrated, the wide wave pattern produced acceptable lift within the available fluidic resources. Likewise, a fourth actuation mode, represented by point 1006, was performed using an example narrow wave pattern, such as disclosed in connection with FIG. 7, that also produced high lift within the available air supply limit. Additionally, with the reduction in pressure requirement, the piping system 602 can be significantly lighter than in known systems, which further decreases the gross weight of the aircraft 100.

Figure 11:
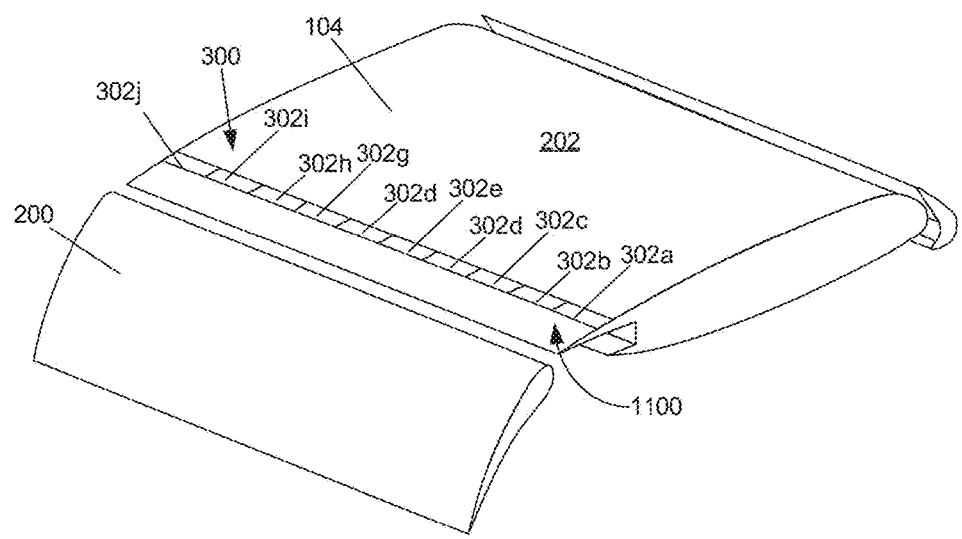
FIG. 11 illustrates the example active flow control system of FIG. 3 disposed in an alternative location.

In the illustrated example of FIG. 3, the plurality of nozzles 302*a*-302*j* are disposed within the flap 200. However, in other examples, the nozzles 302*a*-302*j* may be disposed in other locations to produce a similar effect. For example, as illustrated in FIG. 11, the plurality of nozzles 302a-302j are disposed in the first wing 104, fore of the flap 200. The nozzles 302a-302j are exposed via a slot 1100 in the upper surface 202 of the first wing 104. The nozzles 302a-302j may be activated and deactivated according a desired or selected wave pattern as described above to eject pressurized air in the streamwise direction, similar to the example implementation in FIG. 3. In other examples, the nozzles 302a-302j may be disposed in other locations. For example, the nozzles may be disposed between the flap 200 and the first wing 104, and the nozzles 302a-302j may be deployed or extended rearward when the flap 200 is deployed.

Although ten nozzles are described in connection with the illustrated examples, it is understood that the example active flow control system 300 may be employ more or fewer nozzles (e.g., three nozzles, fifty nozzles, etc.). Further, while the example active flow control system 300 is described in connection with the flap 200, the example active flow control system 300 can be similarly implemented in connection with any other control surface such as an aileron, an elevator, a slat, a rudder, a spoiler and/or any other control surface on a leading edge, a trailing edge, or between a leading edge and a trailing edge. For example, the example active control system 300 may be implemented in connection with a leading edge slat. In such an example, the nozzles are oriented to direct air in the streamwise or rear direction. In other examples, the active flow control system 300 could be implemented in other locations. For example, the active flow control system 300 may be implemented above a front windshield of the fuselage 102 to decrease airflow separation directly behind the front windshield. While the example active flow control system 300 is illustrated in connection with an aircraft, the example active flow control system 300 can be similarly implemented on other vehicles (e.g., a helicopter, an automobile, a submersible, etc.) to improve fluid (e.g., air, water, etc.) flow around the respective surfaces.

While an example manner of implementing the active flow control system 300 is illustrated in FIG. 6, one or more of the elements, processes and/or devices illustrated in FIG. 6 may be combined, divided, re-arranged, omitted, eliminated and/or implemented in any other way. Further, the example controller 606, the example control system 610, the example wave pattern selector 612, the example wave pattern database 614 and/or, more generally, the example active flow control system 300 of FIG. 6 may be implemented by hardware, software, firmware and/or any combination of hardware, software and/or firmware. Thus, for example, any of the example controller 606, the example control system 610, the example wave pattern selector 612, the example wave pattern database 614 and/or, more generally, the example active flow control system 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example controller 606, the example control system 610, the example wave pattern selector 612, and/or the example wave pattern database 614 is/are hereby expressly defined to include a tangible computer readable storage device or storage disk such as a memory, a digital versatile disk (DVD), a compact disk (CD), a Blu-ray disk, etc. storing the software and/or firmware. Further still, the example active flow control system 300 of FIG. 6 may include one or more elements, processes and/or devices in addition to, or instead of, those illustrated in FIG. 6, and/or may include more than one of any or all of the illustrated elements, processes and devices.

Figure 12:
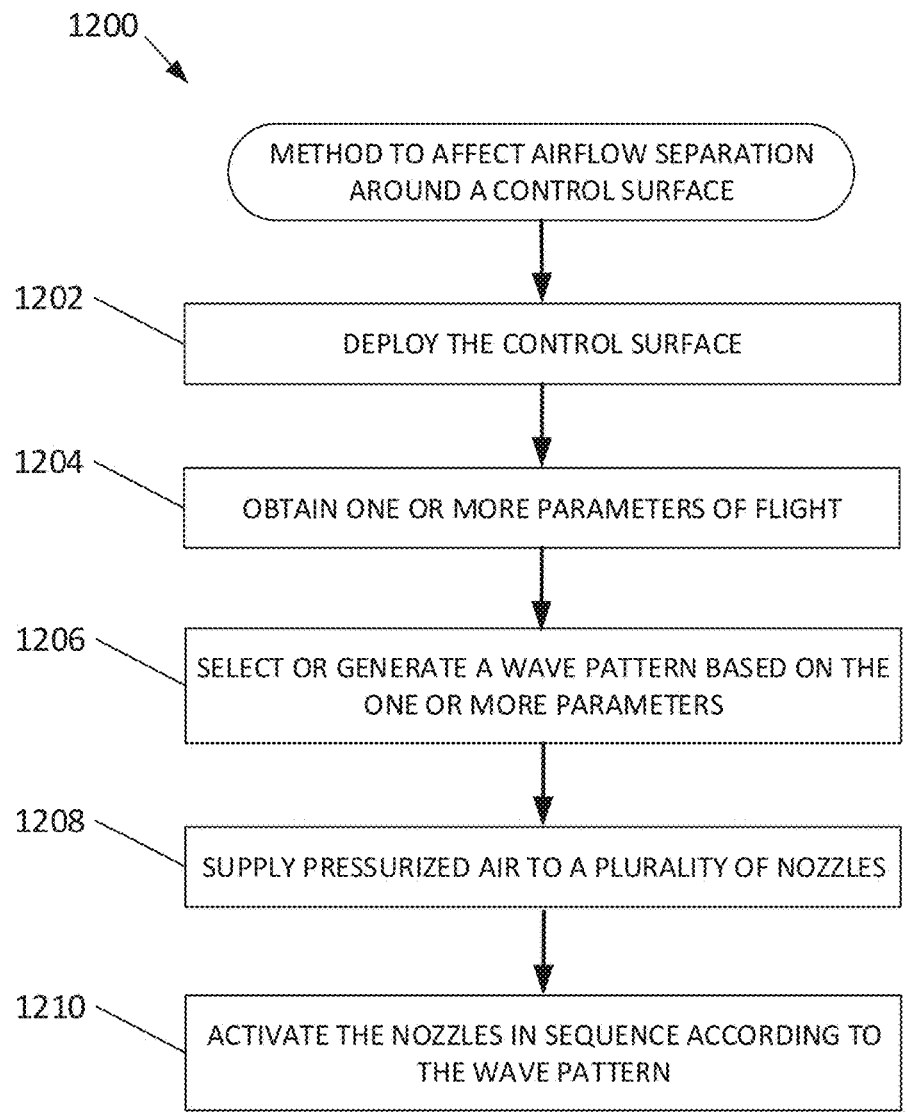
FIG. 12 is a flowchart representative of an example method implemented by the example active flow control system of FIG. 3.

A flowchart representative of an example method for implementing the active flow control system 300 of FIG. 6 is shown in FIG. 12. In this example, the method may be implemented by machine readable instructions that comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 12, many other methods of implementing the example active flow control system 300 may alternatively be used. For example, the order of execution of the blocks may be changed, and/or some of the blocks described may be changed, eliminated, or combined.

As mentioned above, the example method of FIG. 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 12 is a flowchart representative of an example method 1200 to affect airflow separation as implemented by the example active flow control system 300 of FIG. 6. At block 1202, the example method 1200 deploys the control surface. For example, as illustrated in FIGS. 2 and 3, the flap 200 is movable between a stowed position (FIG. 2) and a deployed position (FIG. 3). The nozzles 302a-302j are arranged in an array across the flap 200. In some examples, the nozzles 302a-302j are disposed in the control surface. In other examples, the nozzles 302a-302j are disposed in the wing, adjacent the control surface, or in an area between the wing and the control surface. At block 1204, the example wave pattern selector 612 obtains (e.g., measures) one or more parameters of flight. The one or more parameters may include, for example, an ambient air temperature, an altitude of the aircraft 100, a ground speed of the aircraft 100, a relative airspeed of the aircraft 100, an angle or position of the associated control surface (e.g., the flap 200), a weather condition and/or any other flight setting or control surface setting.

At block 1206, the wave pattern selector 612 selects a wave pattern based on the one or more parameters. In some examples, a plurality of wave patterns are stored in the wave pattern database 614. Additionally or alternatively, in some examples the wave pattern selector 612 generates or creates a wave pattern based on the one or more parameters. The selected (or generated) wave pattern may include, for example, a narrow wave pattern (e.g., as disclosed in connection with FIG. 7), a wide wave pattern (e.g., as disclosed in connection with FIG. 9), a multi-wave pattern (e.g., as disclosed in connection with FIG. 8) and/or any other wave pattern.

At block 1208, the example method 1200 includes supplying pressurized air to the nozzles 302a-302j. The air source 600 of FIG. 6 may be, for example, bleed air from the engine(s) of the aircraft 100, from a compressor, from an APU, and/or from any other source of pressurized air available on the aircraft 100. At block 1210, the controller 606 activates the nozzles 302a-302j (by activating the valves 604a-604j) in sequence according to the wave pattern. The activation includes activating and deactivating the nozzles 302a-302j, simultaneously or individually. For example, to implement a narrow wave pattern, as disclosed in connection with FIG. 7, the nozzles 302a-302j are activated one at a time, in sequence, for a period of time. In some examples, multiple ones of the nozzles 302a-302j may be activated or deactivated, such as in the multi-wave pattern disclosed in connection with FIG. 8. The nozzles 302a-302j are activated in succession or series to form a moving wave of air in the spanwise direction. The example wave pattern may be repeated until deactivated or until the control surface is no longer used, at which point all of the nozzles 302a-302j may be deactivated.

Figure 13:
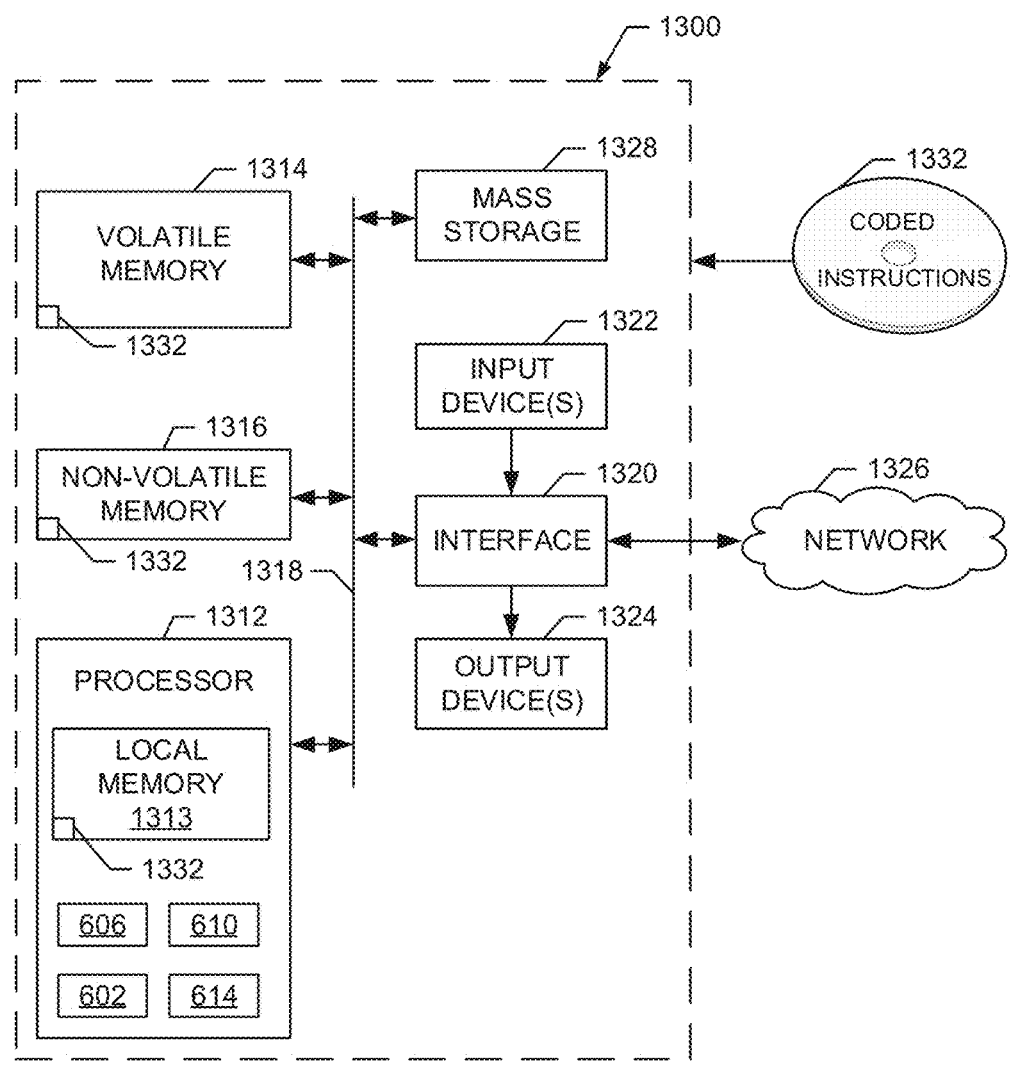
FIG. 13 is a block diagram of an example processor system structured to execute example machine readable instructions represented at least in part by FIG. 12 to implement the example active flow control system of FIG. 3.

FIG. 13 is a block diagram of an example processor platform 1300 capable of executing the method of FIG. 12 to implement the example active flow control system 300 of FIG. 6. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example includes hardware that may implement one or more of the example controller 606, the example control system 610, the example wave pattern selector 612 and/or the example wave pattern database 614 of the active flow control system 300 of FIG. 6. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) 1322 can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

Coded instructions 1332 to implement the method 1200 of FIG. 12 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods, systems/apparatus and articles of manufacture may be used to affect airflow separation around a control surface. The disclosed examples employ a plurality of nozzles that impart momentum into the airflow around a control surface to reattach the airflow and increase lift. This streamlining effect generates greater global circulation, leading to lift augmentation of the control surface, while the amount of actuation required to create such augmentation is greatly reduced. As a result, significantly less air supply is required, which reduces the overall energy needs of the aircraft and weight of the aircraft. Thus, the aircraft may achieve better fuel efficiency.

Although certain example methods, apparatus/systems and articles of manufacture have been disclosed herein, the scope of coverage of this patent is not limited thereto. On the contrary, this patent covers all methods, apparatus/systems and articles of manufacture fairly falling within the scope of the claims of this patent.

What is claimed is:

1. A method comprising:
supplying pressurized air to a plurality of nozzles, the nozzles arranged in an array across a control surface of an aircraft, the nozzles oriented to eject the pressurized air in a substantially streamwise direction;
activating, during a first time period, the nozzles to eject the pressurized air in sequence to create a single wave of air moving in a spanwise direction across the control surface; and
activating, during a second time period, the nozzles to eject the pressurized air in sequence to create a first wave of air and a second wave of air occurring simultaneously and moving in the spanwise direction across the control surface.

2. The method of claim 1, wherein the activating of the nozzles in sequence includes activating and deactivating the nozzles such that only one of the nozzles is activated at a time.

3. The method of claim 1, wherein the activating of the nozzles in sequence includes activating and deactivating the nozzles such that multiple nozzles are activated at a time.

4. The method of claim 1, wherein the second wave of air is separated from the first wave of air by at least one of the nozzles.

5. The method of claim 1, wherein the nozzles are converging-diverging nozzles.

6. The method of claim 1, wherein the nozzles are activated in sequence from outboard to inboard.

7. The method of claim 1, wherein the activating of the nozzles is repeated at a frequency that prevents full separation of airflow over the control surface.

8. The method of claim 1 further including selecting a wave pattern based on at least one of an ambient air temperature, an altitude, an airspeed of the aircraft, a ground speed of the aircraft, a position of the control surface or a weather condition.

9. The method of claim 8 further including activating the nozzles in accordance with the wave pattern.

10. The method of claim 1, wherein each of the nozzles is activated for a same period of time.

11. An apparatus comprising:
a plurality of nozzles arranged in an array across a control surface of an aircraft, the nozzles oriented to eject air in a substantially streamwise direction;
an air source coupled to the nozzles; and
a controller to:
activate, during a first time period, the nozzles to eject air in sequence in accordance with a first wave pattern to create a narrow wave of air moving in a spanwise direction across the control surface; and
activate, during a second time period, the nozzles to eject air in sequence in accordance with a second wave pattern to create a wide wave of air moving in the spanwise direction across the control surface.

12. The apparatus of claim 11, wherein the control surface includes a slot extending spanwise across the control surface, the nozzles disposed within the control surface and exposed via the slot.

13. The apparatus of claim 11, wherein, when the control surface is in a stored position, the nozzles are not exposed, and when the control surface is in a deployed position, the nozzles are exposed.

14. The apparatus of claim 11, wherein, when the control surface is deployed, the nozzles are orientated to eject air at an angle of about 20 degrees relative to an upper surface of the control surface.

15. The apparatus of claim 11, wherein the control surface is at least one of a flap, an aileron, a slat, an elevator or a spoiler.

16. The apparatus of claim 11, wherein the air source is from at least one of bleed air from an engine of the aircraft, an auxiliary power unit or a compressor.

17. The apparatus of claim 11, wherein the nozzles are converging-diverging nozzles.

18. The apparatus of claim 17, wherein the converging-diverging nozzles eject the air at a supersonic speed.

19. The apparatus of claim 11, further including a plurality of valves associated with respective ones of the nozzles.

* * * * *